United States Patent
Reial et al.

(10) Patent No.: US 10,448,343 B2
(45) Date of Patent: Oct. 15, 2019

(54) TRANSMISSION POWER MANAGEMENT (71) Applicant: Telefonaktiebolaget LM Ericsson (publ), Stockholm (SE)

(72) Inventors: Andres Reial, Malmö (SE); Magnus Åström, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/749,530

(22) PCT Filed: Dec. 15, 2017

(86) PCT No.: PCT/EP2017/083020
§ 371 (c)(1),
(2) Date: Feb. 1, 2018

(87) PCT Pub. No.: WO2019/114984
PCT Pub. Date: Jun. 20, 2019

(65) Prior Publication Data
US 2019/0191392 A1    Jun. 20, 2019

(51) Int. Cl.
*H04W 52/34* (2009.01)
*H04W 52/14* (2009.01)
(Continued)

(52) U.S. Cl.
CPC ....... *H04W 52/346* (2013.01); *H04W 52/143* (2013.01); *H04W 52/247* (2013.01);
(Continued)

(58) Field of Classification Search
CPC ............. H04W 52/365; H04W 52/367; H04W 52/346; H04W 52/38; H04W 52/143
See application file for complete search history.

(56) References Cited

U.S. PATENT DOCUMENTS

2012/0184327 A1    7/2012  Love et al.
2012/0270519 A1    10/2012  Ngai et al.
(Continued)

FOREIGN PATENT DOCUMENTS

EP    2538733 A1    12/2012

OTHER PUBLICATIONS

Choi, Yonghoon, et al., "Optimization of Cooperative Inter-Operability in Heterogeneous Networks with Cognitive Ability", IEEE Communications Letters, vol. 15, No. 11, Nov. 2011, 3 pages.
(Continued)

*Primary Examiner* — Keith Ferguson
(74) *Attorney, Agent, or Firm* — Murphy, Bilak & Homiller, PLLC (57)                ABSTRACT A transmission power management method is disclosed for a wireless communication device (WCD), wherein the WCD is configured to operate in a simultaneously connected mode in relation to a plurality of radio access technologies (RATs) served by respective network nodes. The method comprises dynamically determining a transmission power distribution for the plurality of RATs subject to a maximum transmission power constraint of the WCD and causing application of the determined transmission power distribution for the WCD. Causing application of the determined transmission power distribution may comprise transmitting a respective sounding signal towards the respective network node, wherein a respective signal level of the sounding signal is indicative of the determined transmission power distribution. Alternatively or additionally, causing application of the determined transmission power distribution may comprise transmitting an or implicit explicit request for application of the determined transmission power distribution towards the respective network node. Yet alternatively or additionally, causing application of the determined transmission power distribu-
(Continued)

tion may comprise autonomously configuring the WCD to apply the determined transmission power distribution. Corresponding arrangement, wireless communication device and computer program product are also disclosed.

19 Claims, 4 Drawing Sheets

(51) Int. Cl.
*H04W 52/36* (2009.01)
*H04W 52/24* (2009.01)
*H04L 5/00* (2006.01)

(52) U.S. Cl.
CPC ....... *H04W 52/365* (2013.01); *H04W 52/367* (2013.01); *H04L 5/0048* (2013.01)

(56) References Cited

U.S. PATENT DOCUMENTS

2016/0309427 A1* 10/2016 Cho ................... H04W 72/04
2018/0049270 A1* 2/2018 Kubota ............... H04W 76/28

OTHER PUBLICATIONS

Unknown, Author, "P-MPR for HSPA", 3GPP TSG-RAN WG4 Meeting #63, R4-122270, InterDigital, Prague, CZ, May 21-25, 2012, 4 pages.

* cited by examiner

TRANSMISSION POWER MANAGEMENT

TECHNICAL FIELD

The present disclosure relates generally to the field of wireless communication. More particularly, it relates to management of transmission power for a wireless communication device.

BACKGROUND

Traditionally, wireless communication devices (also referred to as UEs, User Equipments) are configured to use one or more radio access technology (RAT), wherein the RATs are significantly different in terms of, for example, which frequency band they reside in, which type of modulation is used, and/or which approach is applied for achieving multiple access (e.g. time division multiple access, TDMA, code division multiple access, CDMA, orthogonal frequency division multiple access, OFDMA, etc.). A few examples include:

- GSM (Global System for Mobile communication) and EDGE (Enhanced Data rates for GSM Evolution) that utilize TDMA in separate 200 kHz frequency bands with modulation based on GMSK (Gaussian Minimum Shift Keying) and/or PSK (Phase Shift Keying),
- UMTS (Universal Mobile Telecommunication System) and HSPA (High Speed Multiple Access) that utilize WCDMA (Wideband CDMA) in 5 MHz frequency bands where different users are separated by spreading codes widening the signal bandwidth, and
- UMTS LTE (UMTS Long Term Evolution) that utilizes orthogonal frequency division multiplex (OFDM), where data is allocated on different subcarriers in the frequency domain and transformed into the time domain via, e.g. an inverse discrete Fourier transform (IDFT).

Since New Radio (NR) is based on the same technique as UMTS LTE, transceivers for these two RATs will typically be able to share some of their fundamental building blocks for signal reception and/or signal transmission. Also higher layer functionality will typically be possible to share to some extent. Thus, many of the functions for NR and UMTS LTE may typically be supported by the same hardware (HW), with functional differences (if any) may be implemented in software (SW).

Generally, and particularly for UMTS LTE and NR, a wireless communication device may operate in one of a number of different modes, e.g. an idle mode and one or more connected modes.

In an idle (or generally; inactive) mode, the wireless communication device typically performs (intra-RAT and inter-RAT) mobility measurements and monitors paging. In an idle mode, the wireless communication device typically attempts to minimize its energy consumption by spending as much time as possible in a low power state and only wake up for short durations of time for measurements and paging monitoring.

In a connected (or generally; active) mode, the wireless communication device is typically constantly transmitting/receiving (e.g. data and/or time/frequency tracking signals). In a connected mode, the wireless communication device typically needs to be ready for high-rate data reception at a short notice.

Some categories of UEs are configured for simultaneous operation in accordance with several RATs (e.g. LTE and NR), for example enabled as an instance of multi-RAT multiple connectivity. In one example of dual-RAT dual connectivity, the UE may be configured to operate simultaneously in UMTS LTE (e.g. to ensure moderate-rate data coverage and system information provision) and NR (e.g. to provide additional high-rate data transmission).

In multi-RAT multiple connectivity, multi-band operations may need to be accommodated since NR may use a wide range of frequency bands and a UE may support multiple NR bands in addition to legacy UMTS LTE frequency bands. For example, a single radio frequency (RF) HW setup in a UE may support several frequency bands in a same frequency region, and the UE may have separate power amplifiers (PAs) or a common PA for transmission in the several frequency bands. However, to support several frequency bands in different frequency regions (e.g. a sub 6 GHz region vs. a millimeter wavelength—mmW—region), separate RF circuitry is typically required; including separate PAs.

Thus, the UE may be subject to HW limitations in the context of multi-RAT multiple connectivity, e.g. concerning supported frequency bands as exemplified above. Alternatively or additionally, the UE may be subject to other HW limitations in the context of multi-RAT multiple connectivity, e.g. concerning maximum possibly transmission power. For example, each PA is associated with maximum power limitations with corresponding distortion and power consumption implications. Furthermore, each UE design is typically associated with intermodulation issues and combinations of spurious signals from different bands that may be inadvertently mixed in the RF circuitry.

Each frequency band used in multi-RAT multiple connectivity is typically also subject to associated EMI (electromagnetic interference) regulations. Such regulations may, for example, stipulate criteria regarding one or more of a total instantaneous power limit, a total average power limit during a predetermined period, a power spectral density limit, and a specific absorption rate (SAR) limit.

Thus, there are several prerequisites to consider when applying multi-RAT multiple connectivity. Transmission power may typically be allocated to the involved RATs according to some default pre-determined distribution that ensures that all pre-requisites are properly handled. However, such an approach is typically sub-optimal in terms of performance metrics such as throughput and/or capacity.

Therefore, there is a need for alternative approaches to transmission power management. Preferably, such approaches lead to improvements in terms of performance metrics such as throughput and/or capacity.

It should be noted that the references herein to the combination of the two RATs UMTS LTE and NR are merely illustrative and that similar problems and/or solutions may be equally applicable for other combinations of RATs in a simultaneously connected mode of a wireless communication device.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

It is an object of some embodiments to solve or mitigate, alleviate, or eliminate at least some of the above or other disadvantages.

According to a first aspect, this is achieved by a transmission power management method for a wireless communication device (WCD) wherein the WCD is configured to operate in a simultaneously connected mode in relation to a plurality of radio access technologies (RATs) served by respective network nodes.

The method comprises dynamically determining a transmission power distribution for the plurality of RATs subject to a maximum transmission power constraint of the WCD and causing application of the determined transmission power distribution for the WCD.

In some embodiments, causing application of the determined transmission power distribution may comprise one or more of:

transmitting a respective sounding signal towards the respective network node, wherein a respective signal level of the sounding signal is indicative of the determined transmission power distribution, transmitting an explicit request for application of the determined transmission power distribution towards the respective network node, transmitting an implicit request for application of the determined transmission power distribution towards the respective network node, and autonomously configuring the WCD to apply the determined transmission power distribution.

In some embodiments, determining the transmission power distribution may comprise choosing a first transmission power distribution associated with a first aggregate throughput for the plurality of RATs over a second transmission power distribution associated with a second aggregate throughput for the plurality of RATs when the first aggregate throughput is higher than the second aggregate throughput.

In some embodiments, determining the transmission power distribution may be based on a respective relationship between throughput and transmission power for each of the plurality of RATs.

In some embodiments, transmission power operational points—each comprising a transmission power value for each of the plurality of RATs—may be defined subject to the maximum transmission power constraint of the WCD. Then, determining the transmission power distribution may comprise:

determining a current aggregate throughput for the plurality of RATs based on a current transmission power distribution associated with a current transmission power operational point, determining a potential aggregate throughput for the plurality of RATs based on a potential transmission power distribution associated with a potential transmission power operational point (wherein the potential transmission power operational point differs from the current transmission power operational point in at least one of the transmission power values), and replacing the current transmission power distribution by the potential transmission power distribution when the potential aggregate throughput is higher than the current aggregate throughput.

In some embodiments, wherein at least two of the plurality of RATs use different power amplifiers, determining the transmission power distribution may be further subject to a maximum transmission power constraint of each of the different power amplifiers.

In some embodiments, determining the transmission power distribution may be further subject to one or more of:

a transmission power regulatory constraint of at least one of the plurality of RATs, a maximum latency constraint of at least one of the plurality of RATs, and a maximum block error rate constraint of at least one of the plurality of RATs.

In some embodiments, determining the transmission power distribution may comprise continuing operation in simultaneous connected mode in relation to the plurality of RATs when the maximum transmission power constraint of the WCD, together with a respective bandwidth constraint of each of the plurality of RATs and a respective interference constraint of each of the plurality of RATs, indicate that the operation is bandwidth limited.

In some embodiments, determining the transmission power distribution may comprise terminating operation in simultaneous connected mode in relation to the plurality of RATs when the maximum transmission power constraint of the WCD, together with a respective bandwidth constraint of each of the plurality of RATs and a respective interference constraint of each of the plurality of RATs, indicate that the operation is interference limited.

In some embodiments, the method may further comprise transmitting respective signals of each of the plurality of RATs in accordance with the determined transmission power distribution.

In some embodiments, the plurality RATs may comprise at least a first RAT and a second RAT and wherein transmission in relation to the first RAT comprises application of standardization principles of Universal Mobile Telecommunication Standard-Long Term Evolution, UMTS LTE, and wherein transmission in relation to the second RAT comprises application of standardization principles of New Radio, NR.

A second aspect is a computer program product comprising a non-transitory computer readable medium, having thereon a computer program comprising program instructions. The computer program is loadable into a data processing unit and configured to cause execution of the method according to the first aspect when the computer program is run by the data processing unit.

A third aspect is a transmission power management arrangement for a wireless communication device (WCD) wherein the WCD is configured to operate in a simultaneously connected mode in relation to a plurality of radio access technologies (RATs) served by respective network nodes.

The arrangement comprising controlling circuitry configured to cause dynamic determination of a transmission power distribution for the plurality of RATs subject to a maximum transmission power constraint of the WCD, and application of the determined transmission power distribution for the WCD.

A fourth aspect is a wireless communication device comprising the arrangement of the third aspect.

In some embodiments, any of the above aspects may additionally have features identical with or corresponding to any of the various features as explained above for any of the other aspects. In particular, the third aspect may, according to some embodiments, have features identical with or corresponding to any of the various features as explained above for the first aspect.

An advantage of some embodiments is that an alternative approach to transmission power management is provided. In some embodiments, the approach dynamically determines a distribution of transmission power among the RATs involved.

Another advantage of some embodiments is that improvements in terms of performance metrics (e.g. throughput and/or capacity) may be achieved compared to when a default (e.g. predetermined) transmission power distribution is used.

Yet an advantage of some embodiments is that the uplink (UL) performance of a UE operating in a multi-RAT multiple connectivity scenario may be maximized (or at least improved). This may be achieved by ensuring that the transmission (TX) power distribution (i.e. a TX power allocation for the RATs involved) is optimized in view of the UL performance; possibly subject to some prerequisites or constraints (e.g. regulatory constraints and/or HW limitations of the UE).

Another advantage of some embodiments is that improvements may be achieved in terms of one or more of: UE resource usage, network (NW) resource usage, user experience, and network efficiency.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

A typical approach to transmission power management in a dual/multi-RAT UE may be to operate at default (e.g. pre-determined) transmit power partitioning, e.g. use a uniform transmission power distribution (half of the TX power for each RAT in dual connectivity mode).

By using a default mode, it may be ensured that regulations regarding emission limits and similar are not violated, that no HW constraints are violated, and that no excessive interference is caused by the simultaneous RAT operation.

While such an approach may ensure that regulatory and other constraints are satisfied, it may typically result in a less than optimum efficiency in terms of performance metrics (e.g. UE and/or NW resource usage, throughput, capacity, etc.). Thus, at least in some scenarios, the above approach leads to that the full performance potential is not reached.

Some embodiments described herein provide improved power allocation that considers multiple relevant constraints and yields improved total performance; e.g. in terms of UE throughput and capacity.

In the following, embodiments will be described where alternative approaches to transmission power management are provided.

Figure 1:
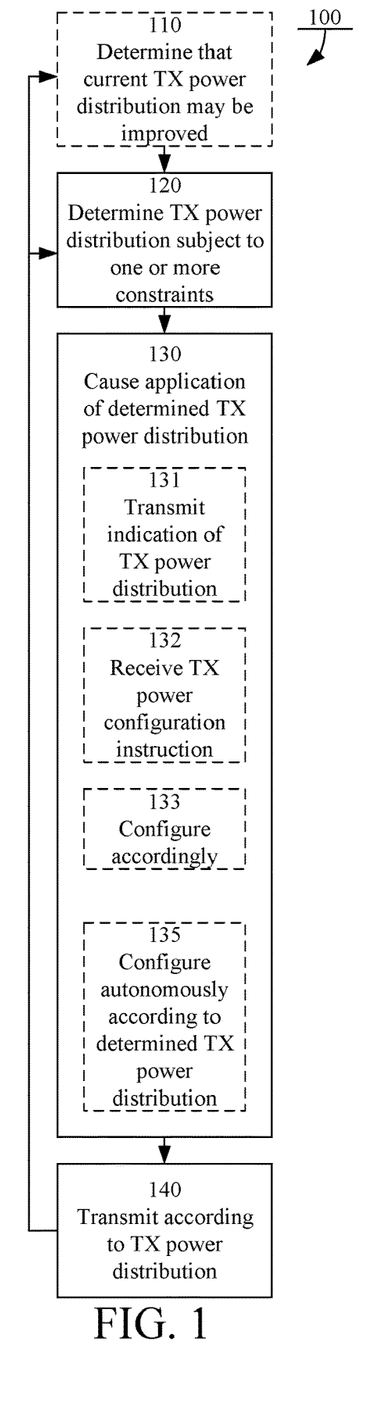
FIG. 1 is a flowchart illustrating example method steps according to some embodiments.

FIG. 1 illustrates an example method 100 according to some embodiments. The method 100 is a transmission power management method for a wireless communication device (WCD), wherein the WCD is configured to operate in a simultaneously connected mode in relation to a plurality of radio access technologies (RATs) served by respective network nodes. Thus, the WCD is configured to communicate using several RATs, whereof it may operate in a simultaneously connected mode in relation to a plurality (two or more) of the several RATs.

The plurality RATs may, for example, comprise at least a first RAT and a second RAT and wherein transmission in relation to the first RAT comprises application of standardization principles of (i.e. application of network signaling standardized for) UMTS LTE and wherein transmission in relation to the second RAT comprises application of standardization principles of (i.e. application of network signaling standardized for) NR.

The respective network nodes may be the same network nodes for different RATs or may be different network nodes for different RATs. In some embodiments, the operation in simultaneous connected mode entails sharing of at least some HW resources (e.g. one or more of PA, FFT/IFFT blocks, channel decoders, etc.) of the WCD between at least two of the plurality of RATs.

In optional step 110 it may be determined that the currently used transmission (TX) power distribution may be improved. This may, for example, comprise comparing a calculated theoretically achievable throughput for the currently used transmission power distribution to a calculated theoretically achievable throughput for one or more other transmission power distributions. Then, it may be determined that the currently used transmission power distribution may be improved if the calculated theoretically achievable throughput for at least one of the other transmission power distributions exceed the calculated theoretically achievable throughput for the currently used transmission power distribution.

Generally, transmission power distributions referred to herein may, in some embodiments, be defined via discrete operational points (each comprising a transmission power value for each of the plurality of RATs) satisfying one or more boundary conditions.

Example boundary conditions include emission regulations and HW limitations of the WCD. Emission regulations may, for example, impose an instantaneous transmission power limit, an average transmission power limit during a predetermined time period, a transmission power spectral density limit, a SAR limit, and/or any other type of EMI limit. HW limitations of the WCD may, for example, comprise a total available transmission power (maximum transmission power constraint of the WCD, average or instantaneous), an available transmission power per RAT, PA capabilities (maximum available power for the different RATs when operated using separate PAs or shared PA, average or instantaneous), RF intermodulation properties (spurious signal generation patterns when operating in different frequency bands or using carrier frequencies), thermal limitations, and/or dependencies on the transmission power in the different radio frequency (RF) circuit elements. Information regarding HW limitations may, for example, be stored in a table in nonvolatile memory of the WCD. Additional HW limitations may comprise or relate to processing capacity limits in different RAT modes, wherein processing capacity may, for example, be in terms of one or more of maximum data rate, symbol rate, frequency range, etc.

In step 120, a transmit power distribution is dynamically determined for the plurality of RATs subject to one or more constraints, wherein the constraints comprise a maximum transmission power constraint of the WCD.

Generally, the total transmission power resulting from the transmission power distribution typically cannot exceed the maximum transmission power of the WCD. However, the total transmission power resulting from the transmission power distribution can be below the maximum transmission power and does not necessarily need to be the same for all distributions.

The maximum transmission power constraint of the WCD is typically caused by HW limitations of the WCD (e.g. maximum PA TX power, maximum PA power consumption, etc.). For example, when at least two of the plurality of RATs use different power amplifiers, determining the transmission power distribution may be further subject to a maximum transmission power constraint of each of the different power amplifiers. When the plurality of RATs use the same power amplifier, determining the transmission power distribution may be further subject to a maximum transmission power constraint that power amplifier.

Determining the transmission power distribution may be further subject to one or more other constraints than a maximum transmission power constraint of the WCD, for example, one or more of a transmission power regulatory constraint of at least one of the plurality of RATs, a maximum latency constraint of at least one of the plurality of RATs, and a (maximum) block error rate constraint of at least one of the plurality of RATs. In the example of a maximum latency constraint (e.g. imposed by standardization or by quality of service, QoS, requirements of the data transmission), this may be implemented by application of a binary metric—either the maximum latency constraint is fulfilled or not. In the example of a block error rate constraint), this may be implemented by application of a binary metric—either a maximum block error rate constraint is fulfilled or not—or by application of a linear metric—wherein the metric contributes to making a transmission power distribution relatively less preferable for relatively higher block error rates.

Determining the transmission power distribution may comprise choosing a first transmission power distribution associated with a first aggregate throughput for the plurality of RATs over a second transmission power distribution associated with a second aggregate throughput for the plurality of RATs when the first aggregate throughput is higher than the second aggregate throughput, as exemplified in the following.

The determination of step 120 may, for example, comprise comparing a calculated theoretically achievable throughput for the currently used transmission power distribution to a calculated theoretically achievable (potential) throughput for another transmission power distribution and selecting the other transmission power distribution if the corresponding calculated theoretically achievable throughput for the other transmission power distribution exceeds the calculated theoretically achievable throughput for the currently used transmission power distribution. In some embodiments, the comparison may be iterated until some stopping criterion is met and selecting transmission power distribution having the highest corresponding calculated theoretically achievable throughput. The stopping criterion may, for example, comprise a maximum number of comparisons, or a minimum throughput improvement, or that a difference between a currently achieved throughput and a potential throughput is below a threshold value.

Alternatively or additionally, the determination of step 120 may, for example, comprise measuring a throughput for the currently used transmission power distribution, applying another transmission power distribution, measuring a (potential) throughput for the other transmission power distribution, comparing the measured throughputs, and selecting the transmission power distribution having the highest measured throughput. In some embodiments, this process may be iterated such that there is a stepwise change of the applied transmission power distribution.

Yet alternatively or additionally, the determination of step 120 may, for example, comprise measuring a throughput for the currently used transmission power distribution, calculating a theoretically achievable throughput discrepancy for another transmission power distribution (compared to the currently used transmission power distribution), and selecting the other transmission power distribution if the discrepancy is positive (or, more generally, above some discrepancy threshold value). In some embodiments, this process may be iterated.

Thus, assuming transmission power operational points (each comprising a transmission power value for each of the plurality of RATs) are defined subject to the maximum transmission power constraint of the WCD as explained above, determining the transmission power distribution may comprise determining a current aggregate throughput for the plurality of RATs based on a current transmission power distribution associated with a current transmission power operational point, determining a potential aggregate throughput for the plurality of RATs based on a potential transmission power distribution associated with a potential transmission power operational point (wherein the potential transmission power operational point differs from the current transmission power operational point in at least one of the transmission power values) and replacing the current transmission power distribution by the potential transmission power distribution when the potential aggregate throughput is higher than the current aggregate throughput.

Generally, calculating theoretically achievable (potential) throughput or throughput discrepancy may be based on a respective relationship between throughput and transmission power for each of the plurality of RATs. One example of a suitable relationship subject to applicable bandwidth constraints is defined by the Shannon capacity formula:

$$C=BW \log_2(1+SNR),$$

where C denotes the capacity (which can be directly related to theoretically achievable throughput), BW denotes the signal bandwidth and SNR=S/N denoted the signal-to-noise ratio (in which S can be directly related to the transmission power). Generally, when the transmission power is referred to herein, it should be recognized that the SNR may be alternatively considered if the noise power N varies between the RATs.

In some approaches, the determination of step 120 and/or of step 120 may comprise application of the Shannon capacity formula (or a modified form thereof) for each of the RATs to determine theoretically achievable throughput for each RAT. The aggregated theoretically achievable throughput for the plurality of RATs may then be determined for various operational points (the ensemble of which are determined based on the constraints as exemplified above), and an optimum may be selected; directly or in an iterative manner.

In a classical receiver noise-limited setting ($N=BW \cdot N_0$, where $N_0$ denotes the noise power density), it is possible to identify two operating regions for channel capacity characterization according to the Shannon capacity formula. In a bandwidth limited region, where BW is narrow and N is relatively low, the SNR is relatively high for a fixed transmission power S and the capacity becomes approximately linearly dependent on the bandwidth BW. In a power limited region where the SNR is relatively low, the capacity becomes linearly dependent on the transmission power S.

In some embodiments, step 120 may comprise continuing operation in simultaneous connected mode in relation to the plurality of RATs when the maximum transmission power constraint of the WCD, together with a respective bandwidth constraint of each of the plurality of RATs and a respective interference constraint of each of the plurality of RATs, indicates that the operation is bandwidth limited, while terminating operation in simultaneous connected mode in relation to the plurality of RATs (i.e. selecting a power transmission distribution with a single non-zero value) when the maximum transmission power constraint of the WCD, together with a respective bandwidth constraint of each of the plurality of RATs and a respective interference constraint of each of the plurality of RATs, indicates that the operation is interference limited.

A few more examples, which may or may not be combined as applicable, will now be given to exemplify the range of considerations that may be applied in connection to the determination of step 120.

In a first example, the total RF emissions of the WCD may not exceed some EMI regulatory rules. If two RATs are operated in frequency bands with similar EMI criteria (e.g. total transmission power or transmission power spectral density, PSD), the respective power or PSD of one of the RATs may be backed off compared to single RAT operation so as not to violate the total constraint. If different EMI criteria are specified for the frequency bands were the RATs operate, the WCD may analyze to which extent the individual frequency bands contribute to the individual EMI metrics and may back off, compared to single RAT operation, the power or PSD of the RAT whose UL performance is less critical for the total performance.

In a second example, the total output power of the WCD is limited by the physical (HW) limitations of the WCD. If two RATs use the same PA, the total transmission power is limited by the PAs output power. The WCD may then back off, compared to single RAT operation, one or both of the RATs so that the total power limit for the PA is not exceeded. Which RAT to back off may be determined based on the service(s) the WCD is currently engaged in. For example, a trade-off between low frequency band coverage and high frequency band peak data rates may be considered in relation to the need of current service(s). If two RATs use different PAs, the transmission power of each respective RAT is limited by the PA of that RAT.

In a third example, a dual connectivity configuration is applied when the WCD operates in a bandwidth limited region, wherein the transmission power is distributed relatively uniformly between the RATs, or proportionally to their respective BW. When the WCD operates in an interference limited region, a close to single connectivity configuration may be applied wherein the RAT experiencing the lowest interference is allocated most of the transmission power while the other RAT is allocated a minimum amount of transmission power necessary to maintain a control plane connection.

Step 120 may be applied when it is determined in step 110 that the currently used transmission power distribution may be improved if step 110 is applied. Alternatively or additionally, step 120 may be applied periodically (e.g. at regular time intervals). Yet alternatively or additionally, step 120 may be applied when triggered by some event (e.g. at start-up of a dual/multi-RAT connection, a start-up of a new service in relation to one or more of the RATs, etc.). Even yet alternatively or additionally, step 120 may be applied based on traffic conditions (e.g. for some specified types of services, for some specified traffic loads, depending on whether the traffic is continuous or intermittent, etc.). Thus, finding an optimum operational point may not necessarily correspond to finding a maximum aggregated throughput in all embodiments. Typically, the transmission power distribution is determined and adjusted in relation to a medium-to-long time horizon (i.e. not at a subframe or fast fading level).

Generally, a starting point may be defined for the method 100. For example, a default transmission power distribution may be used as an initial distribution. Such a default transmission power distribution may, for example, be a uniform distribution, a distribution determined by a standardization document, a distribution determined by an operator of the corresponding communication network, a distribution determined by a network node, a distribution determined by the WCD manufacturer, or the last used distribution.

When the transmission power distribution has been determined in step 120, the method proceeds to causing application of the determined transmission power distribution for the WCD in step 130.

Causing application of the determined transmission power distribution may be achieved in various ways. For example, causing application of the determined transmission power distribution may be achieved by autonomously configuring the WCD to apply the determined transmission power distribution as illustrated by sub-step 135.

Alternatively or additionally, causing application of the determined transmission power distribution may be achieved by (for one or more of, typically each of, the plurality of RATs) transmitting some indication of the determined transmission power distribution to the respective network node as illustrated by sub-step 131.

Such indication may comprise a respective sounding signal (e.g. sounding reference signal, SRS, in UMTS LTE and NR), wherein a respective signal level of the sounding signal is indicative of the determined transmission power distribution, and/or an explicit or implicit request for application of the determined transmission power distribution.

According to an example definition, a sounding signal is a reference signal (RS) with known contents (resource element, RE, locations and values) transmitted over a predefined time-frequency range for the purposes of allowing the receiver to identify one or more of: channel properties, link quality, transmitted power, etc. of the corresponding time-frequency region. Typically, example sounding signals may include RS transmitted in the uplink. However, downlink signals, e.g. downlink channel state information reference signals (DL CSI-RS), may additionally or alternatively be defined as sounding signals.

The respective signal level of the sounding signal may be indicative of the determined transmission power distribution via their relative or absolute values. An explicit request may, for example, be comprised in a dedicated control message or a power headroom parameter field (e.g. in a medium access control, MAC, layer report). An implicit request may, for example, be conveyed by a device capability information parameter. In some embodiments, the sounding signal may be seen as an implicit request.

In any case, when the indication of the determined transmission power distribution has been transmitted to the respective network node in sub-step 131, the method may comprise configuring the WCD accordingly as illustrated by sub-step 133.

Yet alternatively or additionally, causing application of the determined transmission power distribution may be achieved by (for one or more of, typically each of, the plurality of RATs) receiving a transmission power allocation configuration indication from the respective network node(s) as illustrated in sub-step 132 and configuring the WCD accordingly as illustrated by sub-step 133.

In some embodiments, when an indication of the determined transmission power distribution has been transmitted to the respective network node in sub-step 131, the method may comprise receiving a transmission power allocation configuration indication from the respective network node(s) as illustrated in sub-step 132, and thereafter configuring the WCD accordingly as illustrated by sub-step 133.

After step 130, the method may proceed to step 140 comprising transmission of respective signals of each of the plurality of RATs in accordance with the determined transmission power distribution. Typically, the determined transmission power distribution may be applied by appropriate scaling (e.g. input signal scaling, gain factor scaling, or supply voltage scaling) being applied to the PAs used for the different RATs, and/or by appropriate scaling being applied to the input signals of the PA used for the several RATs.

After step 140 the method may return to step 110 or to step 120, as applicable, for iteration of the process to achieve dynamic adaptation of the transmission power distribution.

Figure 2:
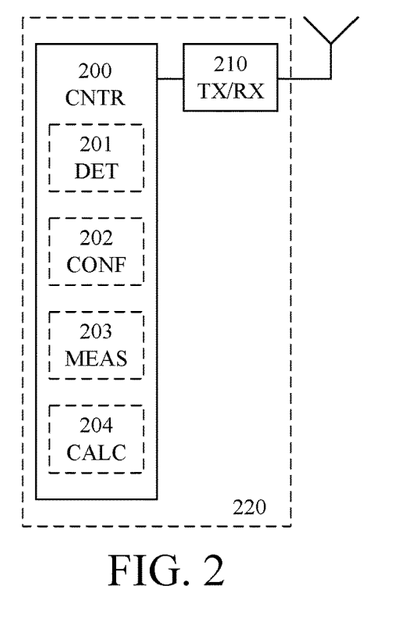
FIG. 2 is a schematic block diagram illustrating an example arrangement according to some embodiments.

FIG. 2 schematically illustrates an example arrangement 220 according to some embodiments. The example arrangement 220 may, for example, be comprised in a wireless communication device. Furthermore, the example arrangement 220 may be configured to perform any of the method steps of FIG. 1 or otherwise described herein.

Thus, FIG. 2 illustrates a transmission power management arrangement 220 for a wireless communication device (WCD), wherein the WCD is configured to operate in a simultaneously connected mode in relation to a plurality of radio access technologies (RATs) served by respective network nodes.

The arrangement comprises controlling circuitry (CNTR) 200 configured to cause dynamic determination of a transmission power distribution for the plurality of RATs subject to a maximum transmission power constraint of the WCD (compare with step 120 of FIG. 1).

To this end, the controller 200 may be associated with a determiner (DET, e.g. determination circuitry) 201 configured to dynamically determine the transmission power distribution for the plurality of RATs. The determiner 201 may or may not be comprised in the controller according to various embodiments.

When the determination is based on throughput measurements as exemplified above, the controller 200 may be further associated with a measurement unit (MEAS, e.g. measuring circuitry) 203 configured to perform such measurements. The measurement unit 203 may or may not be comprised in the controller according to various embodiments.

When the determination is based on calculations of theoretically achievable throughput as exemplified above, the controller 200 may be further associated with a calculator (CALC, e.g. calculating circuitry) 204 configured to perform such calculations. The calculator 204 may or may not be comprised in the controller according to various embodiments.

The determiner 201 may, according to some embodiments, also be configured to determine that the current transmission power distribution may be improved (compare with step 110 of FIG. 1).

The controller 200 is also configured to cause application of the determined transmission power distribution for the WCD (compare with step 130 of FIG. 1).

To this end, the controller may be associated with a transmitter (e.g. transmitting circuitry), illustrated in FIG. 2 in the form of a transceiver (TX/RX, e.g. transceiving circuitry) 210, configured to transmit some indication of the determined transmission power distribution to the respective network node (compare with sub-step 131 of FIG. 1). The transceiver may, alternatively or additionally, be configured to receive a transmission power allocation configuration indication from the respective network node(s) (compare with sub-step 132 of FIG. 1). The transceiver may be comprised in the arrangement 220 as illustrated in FIG. 2. Alternatively, the transceiver may not be comprised in the arrangement 220.

Regardless of whether the WCD is configured to receive a configuration indication from the respective network node(s) and configure itself accordingly (compare with sub-step 133 of FIG. 1) or perform autonomous configuration to apply the determined transmission power distribution (compare with sub-step 135 of FIG. 1), the controller 200 may be associated with a configurer (CONF, e.g. configuration circuitry) 202 configured to cause application of the determined transmission power distribution. The configurer 202 may or may not be comprised in the controller according to various embodiments.

The controlling circuitry may be further configured to cause transmission of respective signals of each of the plurality of RATs in accordance with the determined transmission power distribution (compare with step 140 of FIG.

1). To this end the transceiver may be further configured to transmit the respective signals.

Generally, it should be understood that one need that is met by some embodiments is due to the network not having the relevant knowledge regarding WCD implementation (and/or regarding the other RATs) and thereby typically being unable to determine the preferable transmission power distribution in the same manner as described herein.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a wireless communication device.

Embodiments may appear within an electronic apparatus (such as a wireless communication device) comprising arrangements, circuitry, and/or logic according to any of the embodiments described herein. Alternatively or additionally, an electronic apparatus (such as a wireless communication device) may be configured to perform methods according to any of the embodiments described herein.

Figure 3:
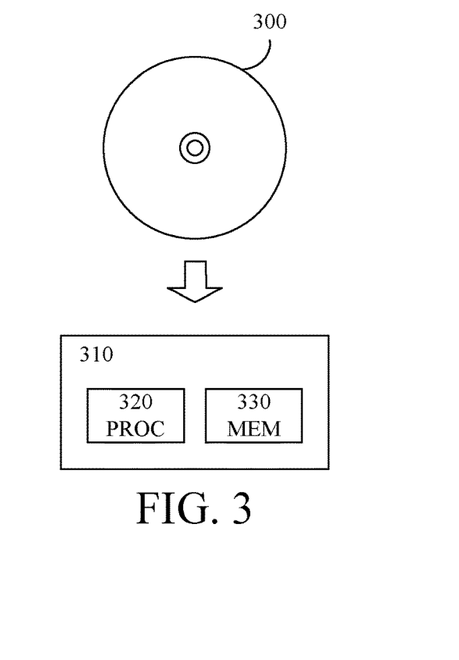
FIG. 3 is a schematic drawing illustrating an example computer readable medium according to some embodiments.

According to some embodiments, a computer program product comprises a computer readable medium such as, for example a universal serial bus (USB) memory, a plug-in card, an embedded drive or a read only memory (ROM). FIG. 3 illustrates an example computer readable medium in the form of a compact disc (CD) ROM 300. The computer readable medium has stored thereon a computer program comprising program instructions. The computer program is loadable into a data processor (PROC) 320, which may, for example, be comprised in a wireless communication device 310. When loaded into the data processing unit, the computer program may be stored in a memory (MEM) 330 associated with or comprised in the data-processing unit. According to some embodiments, the computer program may, when loaded into and run by the data processing unit, cause execution of method steps according to, for example, the method illustrated in FIG. 1 or otherwise described herein.

Figure 4:
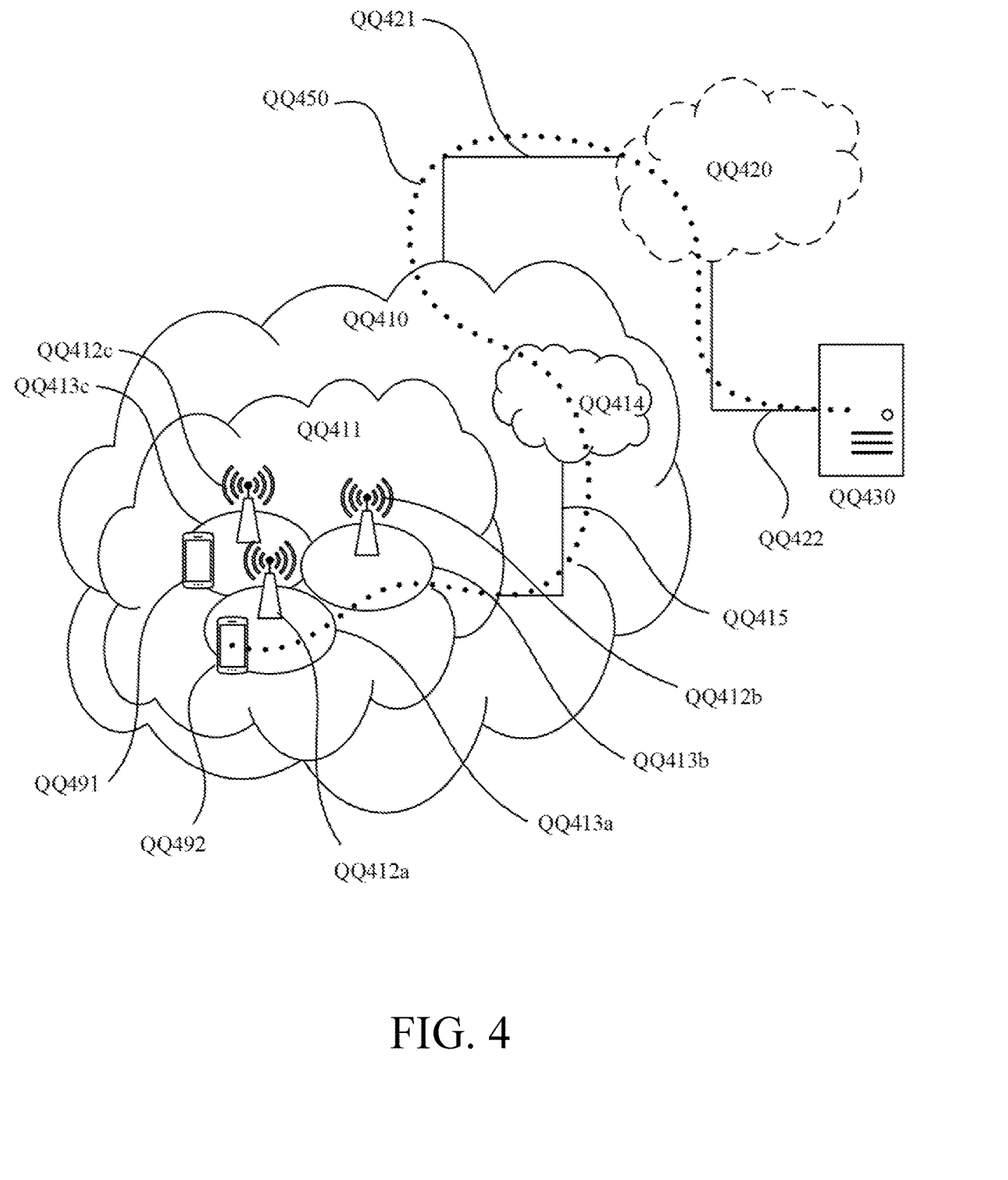
FIG. 4 illustrates a telecommunication network connected via an intermediate network to a host computer in accordance with some embodiments.

With reference to FIG. 4, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 4 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. 5. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 5) served by base station QQ520. Communication interface QQ526 may be configured to facilitate connection QQ560 to host computer QQ510. Connection QQ560 may be direct or it may pass through a core network (not shown in FIG. 5) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

Figure 5:
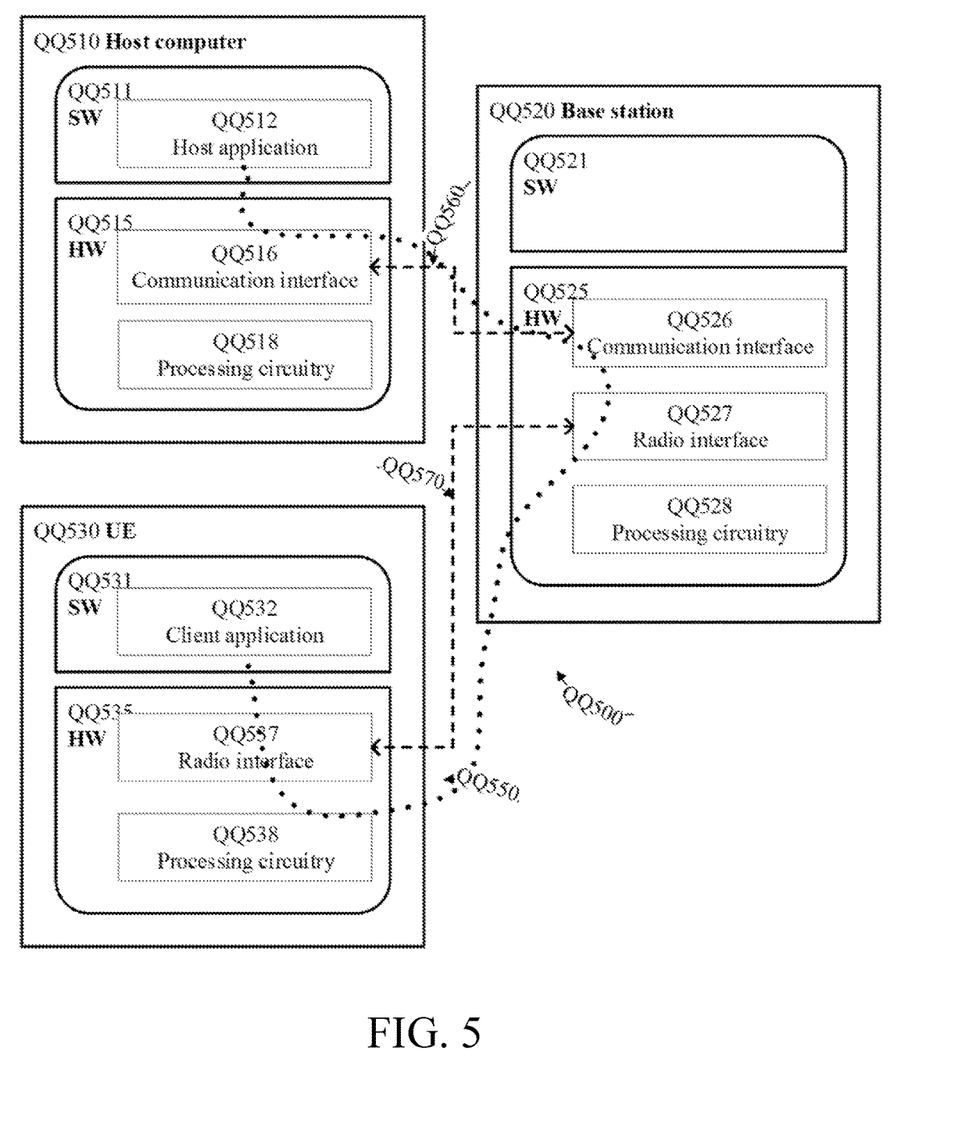
FIG. 5 illustrates a host computer communicating via a base station with a user equipment over a partially wireless connection in accordance with some embodiments.

It is noted that host computer QQ510, base station QQ520 and UE QQ530 illustrated in FIG. 5 may be similar or identical to host computer QQ430, one of base stations QQ412a, QQ412b, QQ412c and one of UEs QQ491, QQ492 of FIG. 4, respectively. This is to say, the inner workings of these entities may be as shown in FIG. 5 and independently, the surrounding network topology may be that of FIG. 4.

In FIG. 5, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may improve the UL performance and thereby provide benefits such as increased throughput.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 6:
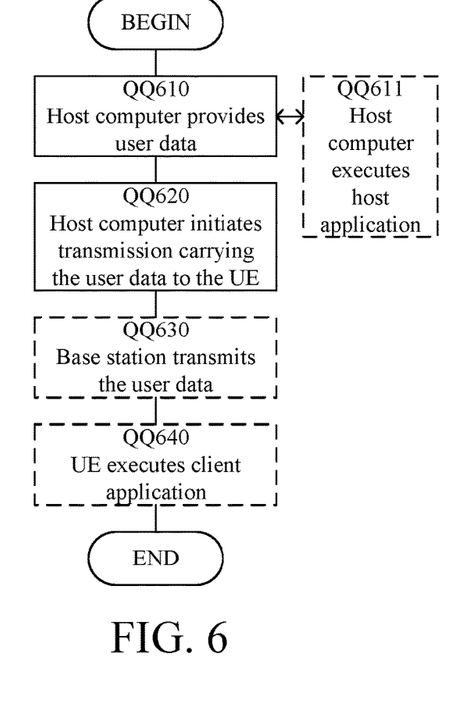
FIG. 6 is a flowchart illustrating example method steps implemented in a communication system including a host computer, a base station and a user equipment in accordance with some embodiments.

FIG. 6 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 6 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 7:
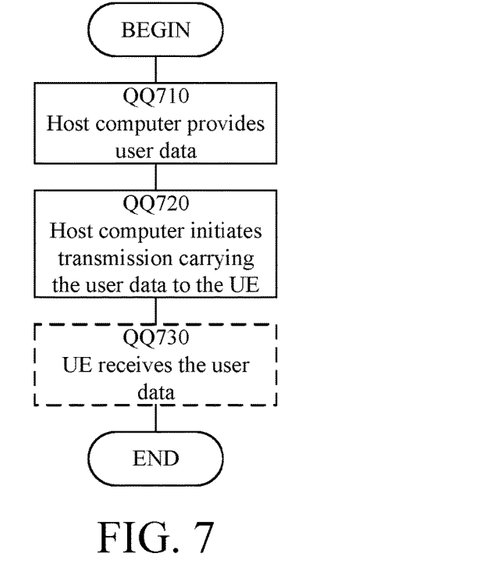
FIG. 7 is a flowchart illustrating example method steps implemented in a communication system including a host computer, a base station and a user equipment in accordance with some embodiments.

FIG. 7 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 7 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 8:
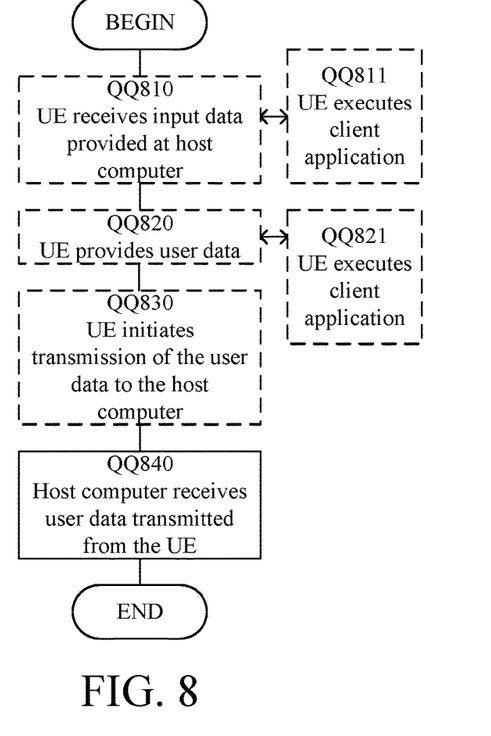
FIG. 8 is a flowchart illustrating example method steps implemented in a communication system including a host computer, a base station and a user equipment in accordance with some embodiments.

FIG. 8 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 8 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 9:
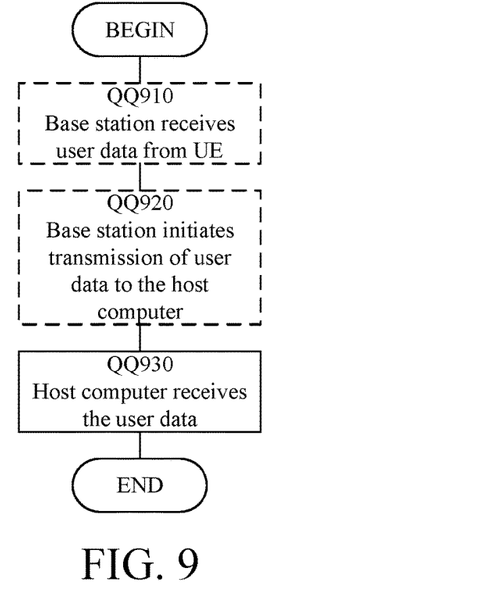
FIG. 9 is a flowchart illustrating example method steps implemented in a communication system including a host computer, a base station and a user equipment in accordance with some embodiments.

FIG. 9 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 9 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

EXAMPLE EMBODIMENTS

Group A Embodiments

A1. A method performed by a wireless device for transmission power management, wherein the wireless device is configured to operate in a simultaneously connected mode in relation to a plurality of radio access technologies, RATs, served by respective network nodes, the method comprising:
dynamically determining a transmission power distribution for the plurality of RATs subject to a maximum transmission power constraint of the WCD; and
causing application of the determined transmission power distribution for the WCD.

A2. The method of any of the previous embodiments in Group A, further comprising:
providing user data; and
forwarding the user data to a host computer via the transmission to the base station.

Group B Embodiments

B1. A method performed by a base station for transmission power management, the method comprising receiving (for causing application of a determined transmission power distribution) one or more of:
a respective sounding signal from a wireless device, wherein a respective signal level of the sounding signal is indicative of a determined transmission power distribution;
an explicit request for application of the determined transmission power distribution from a wireless device; and
an implicit request for application of the determined transmission power distribution from a wireless device.

B2. The method of any of the previous embodiments in Group B, further comprising:
obtaining user data; and
forwarding the user data to a host computer or a wireless device.

Group C Embodiments

C1. A wireless device for transmission power management, the wireless device comprising:
processing circuitry configured to perform any of the steps of any of the Group A embodiments; and
power supply circuitry configured to supply power to the wireless device.

C2. A base station for transmission power management, the base station comprising:
processing circuitry configured to perform any of the steps of any of the Group B embodiments;

power supply circuitry configured to supply power to the wireless device.

C3. A user equipment (UE) for transmission power management, the UE comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

Group D Embodiments

D1. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps according to the Group B embodiments.

D2. The communication system of embodiment D1 further including the base station.

D3. The communication system of any of embodiments D1 through D2, further including the UE, wherein the UE is configured to communicate with the base station.

D4. The communication system of any of embodiments D1 through D3, wherein:
the processing circuitry of the host computer is configured to execute a host application, thereby providing the user data; and
the UE comprises processing circuitry configured to execute a client application associated with the host application.

D5. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps according to the Group B embodiments.

D6. The method of embodiment D5, further comprising, at the base station, transmitting the user data.

D7. The method of any of embodiments D5 through D6, wherein the user data is provided at the host computer by executing a host application, the method further comprising, at the UE, executing a client application associated with the host application.

D8. A user equipment (UE) configured to communicate with a base station, the UE comprising a radio interface and processing circuitry configured to perform the method of any of embodiments D5 through D7.

D9. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps according to the Group A embodiments.

D10. The communication system of embodiment D9, wherein the cellular network further includes a base station configured to communicate with the UE.

D11. The communication system of any of embodiments D9 through D10, wherein:
the processing circuitry of the host computer is configured to execute a host application, thereby providing the user data; and
the UE's processing circuitry is configured to execute a client application associated with the host application.

D12. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps according to the Group A embodiments.

D13. The method of embodiment D12, further comprising at the UE, receiving the user data from the base station.

D14. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps according to the Group A embodiments.

D15. The communication system of embodiment D14, further including the UE.

D16. The communication system of any of embodiments D14 through D15, further including the base station, wherein the base station comprises a radio interface configured to communicate with the UE and a communication interface configured to forward to the host computer the user data carried by a transmission from the UE to the base station.

D17. The communication system of any of embodiments D14 through D16, wherein:
the processing circuitry of the host computer is configured to execute a host application; and
the UE's processing circuitry is configured to execute a client application associated with the host application, thereby providing the user data.

D18. The communication system of any of embodiments D14 through D17, wherein:
the processing circuitry of the host computer is configured to execute a host application, thereby providing request data; and
the UE's processing circuitry is configured to execute a client application associated with the host application, thereby providing the user data in response to the request data.

D19. A method implemented in a communication system including a host computer, a base station and a user equipment (UE), the method comprising:

at the host computer, receiving user data transmitted to the base station from the UE, wherein the UE performs any of the steps according to the Group A embodiments.

D20. The method of embodiment D19, further comprising, at the UE, providing the user data to the base station.

D21. The method of any of embodiments D19 through D20, further comprising:
at the UE, executing a client application, thereby providing the user data to be transmitted; and
at the host computer, executing a host application associated with the client application.

D22. The method of any of embodiments D19 through D21, further comprising:
at the UE, executing a client application; and
at the UE, receiving input data to the client application, the input data being provided at the host computer by executing a host application associated with the client application,
wherein the user data to be transmitted is provided by the client application in response to the input data.

D23. A user equipment (UE) configured to communicate with a base station, the UE comprising a radio interface and processing circuitry configured to perform the method of any of embodiments D19 through D22.

D24. A communication system including a host computer comprising a communication interface configured to receive user data originating from a transmission from a user equipment (UE) to a base station, wherein the base station comprises a radio interface and processing circuitry, the base station's processing circuitry configured to perform any of the steps described for the Group B embodiments.

D25. The communication system of embodiment D24 further including the base station.

D26. The communication system of any of embodiments D24 through D25, further including the UE, wherein the UE is configured to communicate with the base station.

D27. The communication system of any of embodiments D24 through D25, wherein:
the processing circuitry of the host computer is configured to execute a host application;
the UE is configured to execute a client application associated with the host application, thereby providing the user data to be received by the host computer.

D28. A method implemented in a communication system including a host computer, a base station and a user equipment (UE), the method comprising:
at the host computer, receiving, from the base station, user data originating from a transmission which the base station has received from the UE, wherein the UE performs any of the steps described for the Group A embodiments.

D29. The method of embodiment D28, further comprising at the base station, receiving the user data from the UE.

D30. The method of any of embodiments D28 through D29, further comprising at the base station, initiating a transmission of the received user data to the host computer.

D31. A method implemented in a communication system including a host computer, a base station and a user equipment (UE), the method comprising:
at the host computer, receiving, from the base station, user data originating from a transmission which the base station has received from the UE, wherein the base station performs any of the steps described for the Group B embodiments.

D32. The method of embodiment D31, further comprising at the base station, receiving the user data from the UE.

D33. The method of any of embodiments D31 through D32, further comprising at the base station, initiating a transmission of the received user data to the host computer.

The invention claimed is:

1. A transmission power management method for a wireless communication device (WCD), wherein the WCD is configured to operate in a simultaneously connected mode in relation to a plurality of radio access technologies (RATs), served by respective network nodes, the method comprising:
dynamically determining a transmission power distribution for the plurality of RATs subject to a maximum transmission power constraint of the WCD; and
causing application of the transmission power distribution for the WCD;
wherein at least two of the plurality of RATs use different power amplifiers, and wherein determining the transmission power distribution is further subject to a maximum transmission power constraint of each of the different power amplifiers.

2. The method of claim 1, wherein causing application of the transmission power distribution comprises one or more of:
transmitting a respective sounding signal towards a respective network node, wherein a respective signal level of the respective sounding signal is indicative of the transmission power distribution;
transmitting an explicit request for application of the transmission power distribution towards a respective network node;
transmitting an implicit request for application of the transmission power distribution towards a respective network node; and
autonomously configuring the WCD to apply the transmission power distribution.

3. The method of claim 1, wherein determining the transmission power distribution is based on a respective relationship between throughput and transmission power for each of the plurality of RATs.

4. The method of claim 1, wherein transmission power operational points, each comprising a transmission power value for each of the plurality of RATs, are defined subject to the maximum transmission power constraint of the WCD, and wherein determining the transmission power distribution comprises:
determining a current aggregate throughput for the plurality of RATs based on a current transmission power distribution associated with a current transmission power operational point;
determining a potential aggregate throughput for the plurality of RATs based on a potential transmission power distribution associated with a potential transmission power operational point, wherein the potential transmission power operational point differs from the current transmission power operational point in at least one of the transmission power values; and
replacing the current transmission power distribution with the potential transmission power distribution when the potential aggregate throughput is higher than the current aggregate throughput.

5. The method of claim 1, wherein determining the transmission power distribution is further subject to one or more of:
a transmission power regulatory constraint of at least one of the plurality of RATs;
a maximum latency constraint of at least one of the plurality of RATs; and a maximum block error rate constraint of at least one of the plurality of RATs.

6. The method of claim 1, further comprising transmitting respective signals of each of the plurality of RATs in accordance with the transmission power distribution.

7. The method of claim 1, wherein the plurality of RATs comprises at least a first RAT and a second RAT, and wherein transmission in relation to the first RAT comprises application of standardization principles of Universal Mobile Telecommunication Standard Long Term Evolution (UMTS LTE), and wherein transmission in relation to the second RAT comprises application of standardization principles of New Radio (NR).

8. A transmission power management arrangement for a wireless communication device (WCD), wherein the WCD is configured to operate in a simultaneously connected mode in relation to a plurality of radio access technologies (RATs), served by respective network nodes, the arrangement comprising:
communication circuitry configured for communicating with at least one of the respective network nodes; and
controlling circuitry operatively associated with the transceiver circuitry and configured to:
dynamically determine a transmission power distribution for the plurality of RATs subject to a maximum transmission power constraint of the WCD; and
cause application of the transmission power distribution for the WCD; and
wherein at least two of the plurality of RATs use different power amplifiers, and wherein the controlling circuitry is configured to determine the transmission power distribution further subject to a maximum transmission power constraint of each of the different power amplifiers.

9. The arrangement of claim 8, wherein the controlling circuitry is configured to cause the application of the transmission power distribution by:
transmitting a respective sounding signal towards a respective network node, wherein a respective signal level of the respective sounding signal is indicative of the transmission power distribution;
transmitting an explicit request for application of the transmission power distribution towards a respective network node;
transmitting an implicit request for application of the transmission power distribution towards a respective network node; and
autonomously configuring the WCD to apply the transmission power distribution.

10. The arrangement of claim 8, wherein the controlling circuitry is configured to determine the transmission power distribution based on a respective relationship between throughput and transmission power for each of the plurality of RATs.

11. The arrangement of claim 8, wherein transmission power operational points, each comprising a transmission power value for each of the plurality of RATs, are defined subject to the maximum transmission power constraint of the WCD, and wherein the controlling circuitry is configured to determine the transmission power distribution by:
determining a current aggregate throughput for the plurality of RATs based on a current transmission power distribution associated with a current transmission power operational point;
determining a potential aggregate throughput for the plurality of RATs based on a potential transmission power distribution associated with a potential transmission power operational point, wherein the potential transmission power operational point differs from the current transmission power operational point in at least one of the transmission power values; and
replacing the current transmission power distribution with the potential transmission power distribution when the potential aggregate throughput is higher than the current aggregate throughput.

12. The arrangement of claim 8, wherein the controlling circuitry is configured to determine the transmission power distribution further subject to one or more of:
a transmission power regulatory constraint of at least one of the plurality of RATs;
a maximum latency constraint of at least one of the plurality of RATs; and
a maximum block error rate constraint of at least one of the plurality of RATs.

13. The arrangement of claim 8, wherein the controlling circuitry is further configured to transmit respective signals of each of the plurality of RATs in accordance with the transmission power distribution.

14. The arrangement of claim 8, wherein the plurality of RATs comprises at least a first RAT and a second RAT, and wherein transmission in relation to the first RAT comprises application of standardization principles of Universal Mobile Telecommunication Standard—Long Term Evolution (UMTS LTE), and wherein transmission in relation to the second RAT comprises application of standardization principles of New Radio (NR).

15. A wireless communication device comprising the arrangement of claim 8.

16. A transmission power management method for a wireless communication device (WCD), wherein the WCD is configured to operate in a simultaneously connected mode in relation to a plurality of radio access technologies (RATs), served by respective network nodes, the method comprising:
dynamically determining a transmission power distribution for the plurality of RATs subject to a maximum transmission power constraint of the WCD; and
causing application of the transmission power distribution for the WCD;
wherein determining the transmission power distribution comprises choosing a first transmission power distribution associated with a first aggregate throughput for the plurality of RATs over a second transmission power distribution associated with a second aggregate throughput for the plurality of RATs when the first aggregate throughput is higher than the second aggregate throughput.

17. A transmission power management method for a wireless communication device (WCD), wherein the WCD is configured to operate in a simultaneously connected mode in relation to a plurality of radio access technologies (RATs), served by respective network nodes, the method comprising:
dynamically determining a transmission power distribution for the plurality of RATs subject to a maximum transmission power constraint of the WCD; and
causing application of the transmission power distribution for the WCD;
wherein determining the transmission power distribution comprises:
continuing operation in the simultaneously connected mode in relation to the plurality of RATs when the maximum transmission power constraint of the WCD, together with a respective bandwidth constraint of each of the plurality of RATs and a respective interference constraint of each of the plurality of RATs, indicate that the operation is bandwidth limited; and terminating operation in the simultaneously connected mode in relation to the plurality of RATs when the maximum transmission power constraint of the WCD, together with a respective bandwidth constraint of each of the plurality of RATs and a respective interference constraint of each of the plurality of RATs, indicate that the operation is interference limited.

18. A transmission power management arrangement for a wireless communication device (WCD), wherein the WCD is configured to operate in a simultaneously connected mode in relation to a plurality of radio access technologies (RATs), served by respective network nodes, the arrangement comprising:

communication circuitry configured for communicating with at least one of the respective network nodes; and
controlling circuitry operatively associated with the transceiver circuitry and configured to:
dynamically determine a transmission power distribution for the plurality of RATs subject to a maximum transmission power constraint of the WCD; and
cause application of the transmission power distribution for the WCD;
wherein the controlling circuitry is configured to determine the transmission power distribution by choosing a first transmission power distribution associated with a first aggregate throughput for the plurality of RATs over a second transmission power distribution associated with a second aggregate throughput for the plurality of RATs, when the first aggregate throughput is higher than the second aggregate throughput.

19. A transmission power management arrangement for a wireless communication device (WCD), wherein the WCD is configured to operate in a simultaneously connected mode in relation to a plurality of radio access technologies (RATs), served by respective network nodes, the arrangement comprising:

communication circuitry configured for communicating with at least one of the respective network nodes; and
controlling circuitry operatively associated with the transceiver circuitry and configured to:
dynamically determine a transmission power distribution for the plurality of RATs subject to a maximum transmission power constraint of the WCD; and
cause application of the transmission power distribution for the WCD;
wherein the controlling circuitry is configured to determine the transmission power distribution by:
continuing operation in the simultaneously connected mode in relation to the plurality of RATs when the maximum transmission power constraint of the WCD, together with a respective bandwidth constraint of each of the plurality of RATs and a respective interference constraint of each of the plurality of RATs, indicate that the operation is bandwidth limited; and
terminating operation in the simultaneously connected mode in relation to the plurality of RATs when the maximum transmission power constraint of the WCD, together with a respective bandwidth constraint of each of the plurality of RATs and a respective interference constraint of each of the plurality of RATs, indicate that the operation is interference limited.

* * * * *